United States Patent [19]

Ohkoshi et al.

[11] 3,949,262
[45] Apr. 6, 1976

[54] CATHODE RAY TUBE WITH COMPENSATION FOR BEAM LANDING SPOT DISTORTION DUE TO WIDE-ANGLE BEAM DEFLECTION

[75] Inventors: Akio Ohkoshi, Tokyo; Takeo Kaji, Tokyo; Tsunenari Saito, Mitaka, all of Japan

[73] Assignee: Sony Corporation, Tokyo, Japan

[22] Filed: May 21, 1975

[21] Appl. No.: 579,581

[30] Foreign Application Priority Data
May 23, 1974 Japan................................ 49-58079

[52] U.S. Cl. ................. 313/412; 313/414; 313/460
[51] Int. Cl.² H01J 29/02; H01J 29/50; H01J 29/51
[58] Field of Search ........... 313/414, 413, 412, 411, 313/409, 417

[56] References Cited
UNITED STATES PATENTS

| | | | |
|---|---|---|---|
| 3,678,316 | 7/1972 | Barten | 313/412 |
| R27,751 | 9/1973 | Yoshida et al. | 313/412 X |

*Primary Examiner*—Robert Segal
*Attorney, Agent, or Firm*—Lewis H. Eslinger; Alvin Sinderbrand

[57] ABSTRACT

In a cathode ray tube in which an electron gun directs one or more electron beams against a phosphor screen through an electron focusing lens, preferably of the unipotential type, constituted by a plurality of tubular electrodes arranged coaxially in succession along the tube axis with a relatively low potential being applied to one of the electrodes and a relatively high potential being applied to the other electrodes, and in which each electron beam is deflected, after passing through the focusing lens, so as to scan the screen in line-scanning and vertical directions; distortion of the landing spot of each beam on the screen, particularly when deflected toward the peripheral portions of the screen, is removed or compensated by forming the tubular electrode which is maintained at the relatively low potential of two axially divided tubular electrode portions having respective end plates or walls extending across their adjacent ends and formed with aligned apertures for the passage through the latter of each beam, with a first pair of diametrically opposed flanges projecting from the periphery of one of the apertures in the axial direction toward the other aperture, and a second pair of diametrically opposed flanges projecting from the periphery of such other aperture in the axial direction toward said one aperture and being orthogonally disposed in relation to said first pair of flanges so as to be interfitted between the latter, so that the application across the two electrode portions of a correction voltage which varies with the angle of deflection of each said beam from the tube axis is effective to provide a varying electric field for obtaining a uniform shape of the landing spot of each beam on all portions of the screen.

11 Claims, 10 Drawing Figures

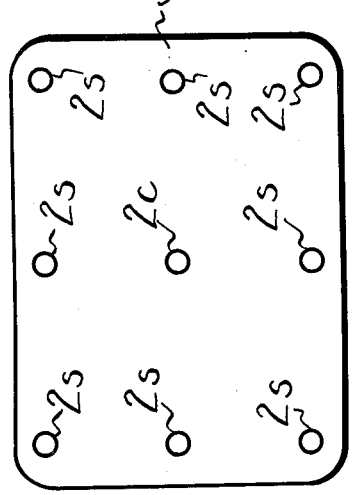
Fig. 1
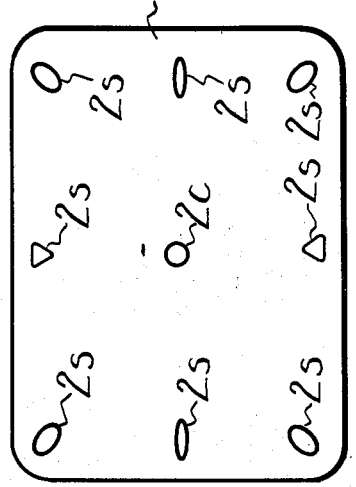
Fig. 9
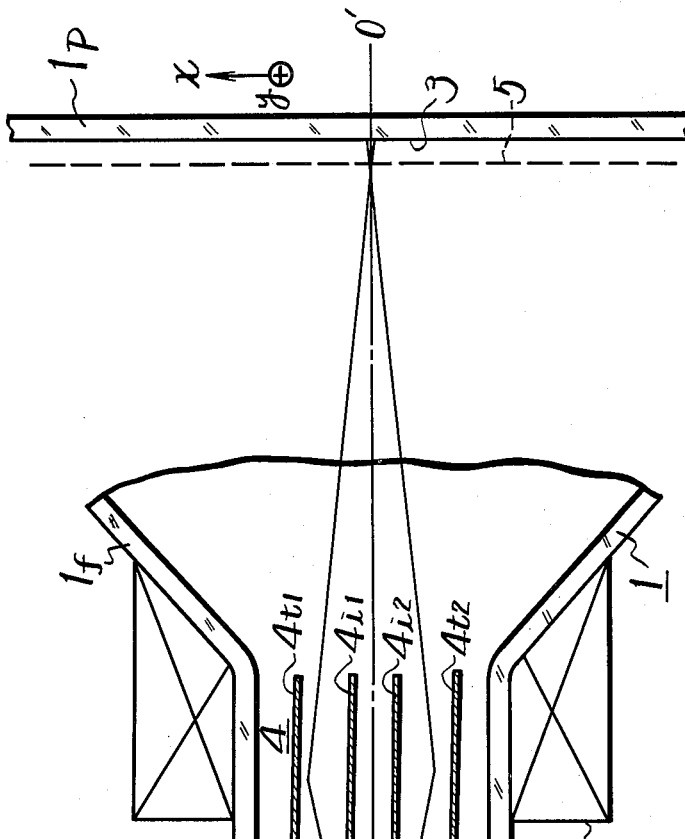
Fig. 2
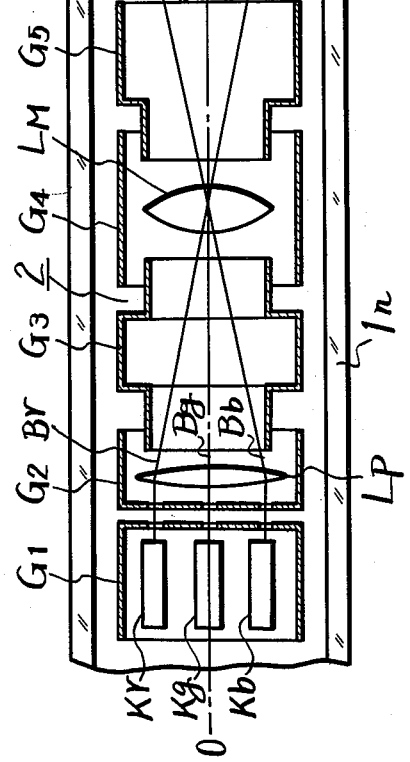

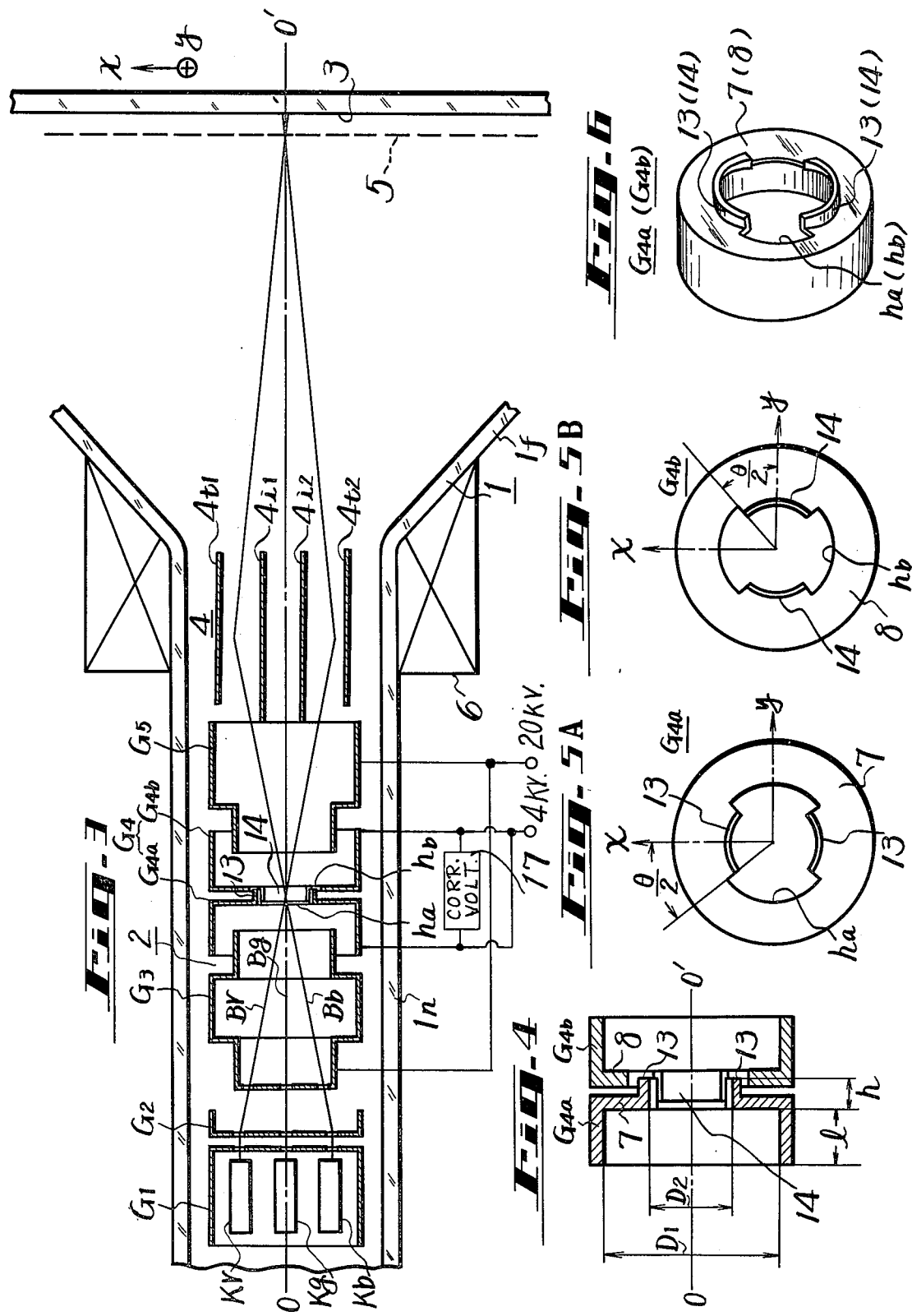

CATHODE RAY TUBE WITH COMPENSATION FOR BEAM LANDING SPOT DISTORTION DUE TO WIDE-ANGLE BEAM DEFLECTION

BACKGROUND OF THE INVENTION

1. Field of the Invention

This invention relates generally to cathode ray tubes, particularly of the single-gun, plural-beam type as used in color video signal reproducing devices, and is more specifically directed to improvements in such cathode ray tubes for compensating or removing beam landing spot distortions due to deflection of the beams for scanning the phosphor screen.

2. Description of the Prior Art

Cathode ray tubes of color video signal reproducing devices, for example, of color television receivers, are being produced with increasingly larger screens. In such cathode ray tubes, for example, of the Trinitron (trademark) type, a single electron gun is disposed within the neck portion of the tube envelope and includes cathodes from which three electron beams corresponding to red, green and blue colors are directed against the color phosphor screen on the panel of the tube envelope which is joined to the neck portion by way of a funnel-shaped portion. The electron gun further includes tubular electrodes which constitute a main focusing lens, preferably of the unipotential type, common to the three beams and by which the latter are focused at the color phosphor screen. A deflection yoke assembly is provided on the tube envelope adjacent the confluence of the neck and funnel-shaped portions and receives horizontal and vertical sweep signals by which the deflection fields are produced for angularly deflecting the beams in respect to the tube axis so as to scan the screen in the horizontal or line-scanning and vertical directions.

When increasing the size of the screen, as aforesaid, it is desirable that the axial dimension of the cathode ray tube, and hence the depth of the cabinet required for containing the same, not be correspondingly increased. Therefore, it has been the practice to increase the size of the screen without correspondingly increasing the axial distance from the deflection yoke assembly to the screen, and even while decreasing such axial distance, in which case it will be apparent that scanning of the screen requires wide-angle deflections of the beams from the tube axis. However, by reason of such wide-angle deflections of the beams, distortions occur in the landing spots of the beams on the screen, particularly at the peripheral portions of the latter. Thus, for example, if the electron beams are focused to provide circular landing spots of the beams on the screen when directed at the central portion of the latter, wide-angle deflections of the beams for directing the latter against peripheral portions of the screen will cause the beams to have elongated or otherwise distorted landing spots on such peripheral portions.

In order to avoid the above described beam landing spot distortion in cathode ray tubes, particularly in tubes employing wide-angle deflections of the beams, it has been proposed to provide magnetic or electrostatic quadrupole arrangements by which additional fields are produced for altering the cross-sectional shapes of the beams as the latter are angularly deflected for scanning the screen. However, such previously proposed or existing quadrupole arrangements for correcting the beam landing spot distortion are of low sensitivity, have a relatively high power consumption, require relatively complex operating circuits, and/or give rise to difficulties in manufacturing and assembling the same. Further, some of the proposed arrangements for correcting the described beam landing spot distortion involve additional electrodes that increase the axial length of the electron gun, and thus are somewhat counter-productive in respect to the originally stated purposes for employing the wide-angle deflections of the beams.

OBJECTS AND SUMMARY OF THE INVENTION

Accordingly, it is an object of this invention to provide a cathode ray tube with correction or compensation for beam landing spot distortion which avoids the above mentioned disadvantages of the arrangements of the prior art for that purpose.

More specifically, it is an object of this invention to correct or compensate for the beam landing spot distortion which results from electron beam deflection in a single-gun, plural-beam color cathode ray tube, for example, of a color television receiver.

Another object is to efficiently effect correction or compensation for beam landing spot distortion, as aforesaid, without the addition of structure to the electron gun that would increase the axial dimension thereof.

In accordance with an aspect of this invention, in a cathode ray tube in which an electron gun directs one or more electron beams against a phosphor screen through an electron focusing lens, preferably of the unipotential type, constituted by a plurality of tubular electrodes arranged coaxially in succession along the tube axis with a relatively low potential being applied to one of the electrodes and a relatively high potential being applied to the other electrodes, and in which each electron beam is deflected, after passing through the focusing lens, so as to scan the screen in line-scanning and vertical directions; distortion of the landing spot of each beam on the screen, particularly when the beam undergoes relatively wide-angle deflections for landing on peripheral portions of the screen, is corrected or compensated for by forming the tubular electrode which is maintained at the relatively low potential of two axially divided tubular electrode portions having respective end plates or walls extending across their adjacent ends and formed with aligned apertures for the passage therethrough of each beam during focusing of the latter, with a first pair of diametrically opposed flanges projecting from the periphery of one of the apertures in the axial direction toward the other aperture, and a second pair of diametrically opposed flanges projecting from the periphery of such other aperture in the axial direction toward the one aperture and being orthogonally disposed in relation to said first pair of flanges so as to be interfitted between the latter, so that the application across the two electrode portions of a correction voltage which varies with the angle of deflection of each beam from the tube axis is effective to provide a varying electric field for obtaining a uniform shape of ths landing spot of each beam on all portions of the screen.

The above, and other objects, features and advantages of the invention will be apparent in the following detailed description of an illustrative embodiment which is to be read in connection with the accompanying drawings.

BRIEF DESCRIPTION OF THE DRAWINGS

FIG. 1 is a schematic diagram showing the distortion of beam landing spots as a result of beam deflection in a cathode ray tube;

FIG. 2 is a schematic axial cross-sectional view showing the main part of a prior art cathode ray tube in which the beam landing spot distortion depicted on FIG. 1 may arise;

FIG. 3 is a schematic axial cross-sectional view showing the main part of a cathode ray tube according to an embodiment of the present invention;

FIG. 4 is an enlarged axial cross-sectional view showing an electrode of a beam focusing lens provided in the cathode ray tube according to the invention;

FIGS. 5A and 5B are front and back elevational views of first and second electrode portions, respectively, making up the focusing lens electrode of FIG. 4;

FIG. 6 is a perspective view of each of the electrode portions shown on FIGS. 5A and 5B;

FIG. 9 is a schematic diagram similar to FIG. 1, but showing beam landing spots which are corrected by the present invention.

DESCRIPTION OF A PREFERRED EMBODIMENT

Figure 7:
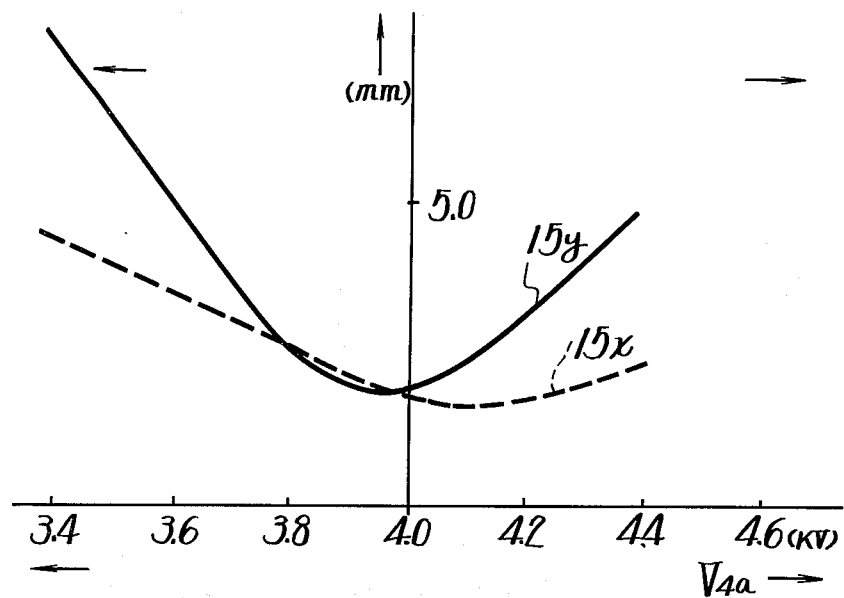
FIGS. 7 and 8 are graphs showing the relation of the voltage applied across the electrode portions of FIG. 4 to the dimensions of the beam landing spot.

In order that the invention will be better understood, reference will be initially made to FIG. 2 showing a single-gun, plural-beam cathode ray tube for a color video signal reproducing device of a type in which the invention is most advantageously embodied, for example, as disclosed in U.S. Pat. No. Re. 27,751, having a common assignee herewith, and known commercially as the Trinitron (trademark) type. The illustrated sigle-gun, plural-beam cathode ray tube is shown to include an envelope 1 having a panel of face portion $1p$ extending across a funnel portion $1f$ that extends from a neck portion $1n$. The panel portion $1p$ has a color phosphor screen 3 coated on its inner surface and being composed of arrays of different color phosphor areas, that is, areas of phosphors which emit different colors when energized by respective electron beams, and which are arranged in groups each intended to form a picture or image element. Disposed adjacent screen 3 is an apertures beam-selecting grill or shadow mask 5. An electron gun 2 is disposed within neck portion $1n$ and is shown to include cathodes $K_r, K_g$ and $K_b$ which constitute respective beam-generating sources with the beam-generating surface thereof being disposed, as shown, in a plane which is substantially perpendicular to the coincident axes $0\text{-}0'$ of electron gun 2 and tube envelope 1. In the illustratec cathode ray tube, the beam-generating surfaces are arranged in a straight line so that the respective beams $B_r, B_g$ and $B_b$ emitted therefrom are directed in a substantially horizontal plane containing the axis $0\text{---}0'$ of the gun, with the central beam $B_g$ being coincident with such axis. A first grid $G_1$ is spaced from the beam-generating surfaces of cathodes $K_r, K_g$ and $K_b$ and has apertures formed therein in alignment with the respective cathode beam-generating surfaces. A second grid $G_2$ is spaced from first grid $G_1$ and has apertures formed therein in alignment with the respective apertures of first grid $G_1$. Successively arranged in the axial direction away from the common grid $G_2$ are tubular grids or electrodes $G_3, G_4$ and $G_5$, respectively which, as hereinafter described, are operative to provide a so-called unipotential main focusing lens by which all of heams $B_r, B_g$ and $B_b$ are focused at screen 3. The cathodes $K_r, K_g$ and $K_b$, grids $G_1$ and $G_2$, and electrodes $G_3, G_4$ and $G_5$ are maintained in the depicted, assembled relative positions thereof, by conventional support means (not shown) of an insulating material.

For operation of the electron gun 2 of FIG. 2, appropriate voltages are applied to grids $G_1$ and $G_2$ and to electrodes $G_3, G_4$ and $G_5$. Thus, for example, a voltage of 0 to minus 400V is applied to grid $G_1$, a voltage of 0 to 500V is applied to grid $G_2$, a relatively high voltage or potential, for example, the anode voltage of 15 to 25KV (kilovolts) is applied to electrodes $G_3$ and $G_5$, and a relatively low voltage or potential, for example, of about 4KV, is applied to electrode $G_4$, with all of these voltages being based upon the cathode voltage as a reference. With the foregoing voltage distribution, an electron lens field will be established between grid $G_2$ and electrode $G_3$ to form an auxiliary lens, as indicated schematically at $L_p$, and an electron lens field will be established around the axis of electrode $G_4$, by the electrodes $G_3, G_4$ and $G_5$, to form a main focusing lens, as indicated schematically at $L_M$.

In operation of electron gunn 2, the electron beams $B_r, B_g$ and $B_b$ which emanate from the beam generating surfaces of cathodes $K_r, K_g$ and $K_b$ will pass through the respective apertures of grid $G_1$ to be intensity modulated with what may be termed the "red","green" and "blue" intensity modulation or color signals applied between said cathodes and the first grid $G_1$. The electron beams will then pass through the auxiliary lens $L_P$ and be made to convetge by the latter so as to intersect each other substantially at the center of the main focusing lens $L_M$. Thereafter, the central beam $B_g$ will exit from the main focusing lens substantially along the tube axis, while the other or side beams $B_r$ and $B_b$ will exit along divergent paths.

Further included in the electron gun 2 of FIG. 2 is electron beam convergence deflecting means 4 which is positioned axially beyond electrode $G_5$ and comprises shielding plates $4i_1$ and $4i_2$ disposed in the depicted spaced relationship at opposite sides of the gun axis, and axially extending, deflector plates $4t_1$ and $4t_2$ which are disposed in outwardly spaced, opposed relationship to shielding plates $4i_1$ and $4i_2$, respectively.

The shielding plates $4i_1$ and $4i_2$ are equally charged so that the central electron beam $B_g$ will pass substantially undeflected therebetween, while the deflector plates $4t_1$ and $4t_2$ have negative or lower charges with respect to the plates $4i_1$ and $4i_2$ so that electron beam $B_b$ and $B_r$, in moving along their above mentioned divergent paths, will be convergently deflected, as shown, by the respective passages thereof between the plates $4i_1$ and $4t_1$ and the plates $4i_2$ and $4t_2$, respectively. More specifically, a voltage which is equal to the voltage applied to the lens electrodes $G_2$ and $G_5$ may be applied to both shielding plates $4i_1$ and $4i_2$, and a voltage which is some 200 to 300V lower than the last mentioned voltage may be applied to both deflector plates $4t_1$ and $4t_2$ to result in the application of a deflecting voltage difference or convergence deflecting voltage between plates $4i_1$ and $4t_1$ and plates $4i_2$ and $4t_2$ and it is, of course, this convergence deflecting voltage which will impart the requisite convergent deflection to the respective electron beams $B_b$ and $B_r$.

It will be apparent that the electron gun 2 is so arranged that, as a result of the convergence deflections imparted to beams $B_r$ and $B_b$ by covergence deflecting means 4, electron beams $B_b, B_g$ and $B_r$ will again converge or cross each other at a common spot centered in an aperture or slit of beam selecting grill or mask 5 so as to diverge therefrom and impinge upon or strike the respective color phopshor areas of a corresponding group thereof on screen 3. The beams $B_r, B_g$ and $B_b$ are made to simultaneously scan screen 3 in the line-scanning or horizontal direction and in the vertical direction by means of a horizontal and vertical deflection yoke assembly 6 which is positioned at the confluence of funnel portion $1f$ and neck portion $1n$, and which conventionally receives horizontal and vertical sweep signals.

It will be apparent that, in the above described color cathode ray tube, each of the beams $B_r, B_g$ and $B_b$ is passed, for focusing, through substantially the center of the main focusing lens $L_M$ of gun 2 so that the beam spots formed by impingement of the beams on screen 16 will be substantially free of coma and/or astigmatism resulting from the focusing action of main lens $L_M$ to provide improved color picture resolution. However, if the axial dimension of the funnel-shaped portion $1f$ of the tube envelope is reduced or if such dimension is not increased while increasing the size of the screen 3 on the panel or face portion $1p$ of the tube envelope, so as to minimize the overall axial dimension of the cathode ray tube and thereby reduce the depth of the cabinet required for containing such tube, scanning of the screen 3 by electron beams $B_r, B_g$ and $B_b$ requires relatively wide-angle deflections of such beams from the tube and gun axis 0—0'. When employing such wide-angle deflections of the electron beams, the landing spots of the beams on the screen 3 will be distorted, particularly when the beams are directed toward peripheral portions of the screen. For example, if each electron beam is focused to provide a circular landing spot when directed at the center of screen 3, as indicated at $2c$ on FIG. 1, the landing spot will be distorted from such normal circular shape, primarily by an elongation in the lateral direction, when the beam is subjected to wide-angle deflections to land on peripheral portions of the screen, as indicated at $2s$ on FIG. 1. Such beam landing spot distortion is caused mainly by astigmatism of the fields produced by deflection yoke 6 and also, to some extend, by the fact that each beam is directed at a substantial angle to the normal to the plane of screen 3 at the beam landing spot $2s$ on a peripheral portion of the screen.

Referring now to FIG. 3, in which the various parts of a cathode ray tube embodying this invention are identified by the same reference numerals as were used to identify the corresponding parts in FIG. 2, it will be seen that, in accordance with this invention, the focusing lens electrode $G_4$ which has a relatively low potential applied thereto, that is, the central electrode of the unipotential focusing lens which further includes the tubular electrodes $G_3$ and $G_5$, is axially divided into first and second tubular electrode portions $G_{4a}$ and $G_{4b}$, respectively. As shown particularly on FIGS. 4, 5A and 5B, the tubular electrode portions $G_{4a}$ and $G_{4b}$ have end plates or walls 7 and 8, respectively extending across their adjacent ends in planes perpendicular to axis 0—0', and such end plates or walls 7 and 8 are formed with central, aligned apertures $ha$ and $hb$, respectively, which are generally circular. Further, a first pair of diametrically opposed arcuate flanges 13 project from the periphery of aperture $ha$ in end wall 7 in the axial direction toward aperture $hb$ in end wall 8. Similarly, a second pair of diametrically opposed arcuate flanges 14 project from the periphery of aperture $hb$ in end wall 8 in the axial direction toward aperture $ha$ in end wall 8, with the flanges 14 being orthogonally related to the flanges 13 so as to be interfitted between the latter with clearance therebetween. Thus, for example, flanges 13 may be disposed at the opposite sides of the respective aperture $ha$, while flanges 14 are disposed at the top and bottom of aperture $hb$ and each of the flanges 13 and 14 has an angular extent $\theta$ about axis 0—0' that is slightly less than 90°, for example, about 84°. With the foregoing arrangement, the flanges 14 can fit into the gaps between flanges 13 and, conversely, flanges 13 can fit into the gaps between flanges 14, with clearances being provided between the adjacent end edges of flanges 13 and 14 which define a generally tubular extension between the axially spaced apart end walls 7 and 8 of tubular electrode portions $G_{4a}$ and $G_{4b}$.

It has been found that compensation or correction for beam landing spot distortion due to wide-angle beam deflection is most effectively achieved in accordance with the present invention when tubular electrode portions $G_{4a}$ and $G_{46}$ are dimensioned to satisfy the following inequalities:

$$0.46\ D_1 > l > 0.3\ D_1 \tag{1}$$

$$2.25\ l > D_2 > 1.75\ l \tag{2}$$

$$0.15\ D_1 > h > 0 \tag{3}$$

in which, $l$ is the axial length of each of the tubular electrode portions $G_{4a}$ and $G_{4b}$, $D_1$ is the inner diameter of each of the tubular electrode portions $G_{4a}$ and $G_{4b}$, $D_2$ is the diametrical distance between the inner surfaces of flanges 13 and of flanges 14, and $h$ is the axial distance that each of the flanges 13 and 14 projects from the inner surface of the respective end wall 7 or 8, as shown on FIG. 4.

When the above dimensional relationships are maintained, and tubular electrodes $G_3$ and $G_5$ have an anode potential of 15 to 25 KV applied thereto while a substantially lower potential, for example, of 4 KV, is applied to both portions $G_{4a}$ and $G_{4b}$ of electrode $G_4$, the electrodes $G_3, G_4$ and $G_5$ form a main electron focusing lens of the unipotential type, which lens is symmetrical about the axis 0—0' so as to focus each beam without distorting its cross-sectional shape, for example, to provide each beam with a circular landing spot when directed at the central portion of the screen 3. However, if the voltages applied to tubular electrode portions $G_{4a}$ and $G_{4b}$ are varied in respect to each other from the mean voltage of 4 KV, the electrical field for focusing the beams becomes asymmetrical with respect to the tube axis and thereby alters the cross-sectional shape of each beam being focused thereby. Therefore, by relatively varying the voltages applied to electrode portions $G_{4a}$ and $G_{4b}$ the cross-sectional shape of each beam, as focused by the main electron lens, can be varied as the beams are deflected to scan the screen so as to correct or compensate for the beam landing spot distortion that would otherwise accompany the scanning deflection of the beams.

Figure 8:
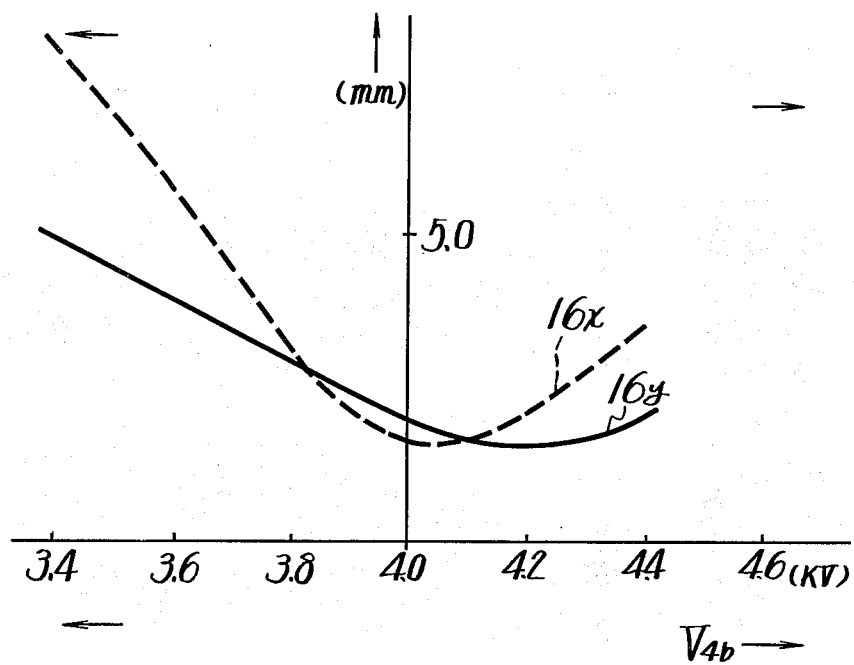

For example, in the case of a cathode ray tube according to this invention as illustrated by FIGS. 3 and 4, and having $l = 4.0$ mm, $D_1 = 13.0$ mm, $D_2 = 7.0$ mm and $h = 1.3$ mm, with the anode voltage applied to electrodes $G_3$ and $G_5$ being 20 KV and the cathode current being 1.0 mA (milli-amperes), FIGS. 7 and 8 illustrate the changes in the lateral and vertical dimensions of each beam landing spot at the center of screen 3 when the voltage applied to one of the electrode portions $G_{4a}$ and $G_{4a}$ is varied while the voltage applied to the other of such electrode portions is maintained constant. More specifically, on FIG. 7, the curves 15x and 15y show the changes in the dimensions of the beam landing spot in the $x$ or horizontal and in the $y$ or vertical direction, respectively, when the voltage applied to electrode portion $G_{4b}$ is maintained constant at 4.0 KV and the voltage applied to the other electrode portion $G_{4a}$ is varied above and below 4.0 KV. Conversely, on FIG. 8, the curves 16x and 16y show the changes in the dimensions of the beam landing spot in the $x$ or horizontal direction and in the $y$ or vertical direction, respectively, when the voltage applied to electrode portion $G_{4a}$ is maintained constant at 4.0 KV and the voltage applied to the other electrode portion $G_{4b}$ is varied above and below 4.0 KV.

It will be apparent from FIGS. 7 and 8 that, when the voltages applied to both electrode portions $G_{4a}$ and $G_{4b}$ are 4.0 KV, the dimensions of the beam landing spot in the $x$ and $y$ directions are approximately equal, that is, the electron focusing field is symmetrical about the axis 0—0' of the tube so as to provide the desired circular beam landing spot. However, when the voltage applied to electrode portion $G_{4b}$ is held at 4.0 KV and the voltage applied to electrode portion $G_{4a}$ is either increased or decreased relative to 4.0 KV, the dimension of the beam landing spot in the $y$ or vertical direction is progressively increased in respect to the dimension in the $x$ or horizontal direction (FIG. 7). On the other hand, when the voltage applied to electrode portion $G_{4a}$ is held at 4.0 KV and the voltage applied to electrode portion $G_{4b}$ is either increased or decreased relative to 4.0 KV, the dimension of the beam landing spot in the $x$ or horizontal direction is progressively increased in respect to the dimension in the $y$ or vertical direction (FIG. 8). In each of FIGS. 7 and 8 the portions of curves 15x and 15y and of curves 16x and 16y, respectively, to the right of the ordinate representing 4.0 KV relate to the under-focused condition, while the portions of such curves to the left of the ordinate of 4.0 KV represent the over-focused condition.

In order to make use of the relative dimensional changes of the beam landing spot depicted on FIGS. 7 and 8 for the purpose of correcting or compensating for the beam landing spot distortion shown on FIG. 1, the cathode ray tube according to this invention (FIG. 3) is further provided with a suitable circuit indicated schematically at 17 for applying across electrode portions $G_{4a}$ and $G_{4b}$ a correction voltage which is varied in accordance with the angle of deflection of the beams from the tube axis 0—0', for example, in response to the horizontal and vertical sweep signals applied to deflection yoke 6 for deflecting the beams and causing the latter to scan screen 3. It will be apparent that, by suitably varying such correction voltage in accordance with the deflection of the beams from thn axis 0—0', the beam landing spots 2s adjacent the periphery of screen 3 can be made to be circular as well as the beam landing spots 2c adjacent the center of the screen, as shown on FIG. 9. For example, during horizontal scanning of the line which passes through the center of the screen, the correction voltage applied across electrode portions $G_{4a}$ and $G_{4b}$ by circuit 17 may be zero when the beams are directed at the center of the screen and may increase progressively with a polarity serving to increase the voltage on electrode portion $G_{4a}$ relative to that on electrode portion $G_{4b}$ in response to horizonal deflection of the beams away from the center of the screen. In the foregoing case, the progressive increase in the voltage on electrode portion $G_{4a}$ relative to that on electrode portion $G_{4b}$ would tend to increase the y or vertical dimension of each beam landing spot relative to its $x$ or horizontal dimension, and would thereby compensate for or overcome the horizontal elongation of each beam landing spot that would otherwise occur at the opposite side portions of the screen.

Further, it has been found that the elimination of the beam landing spot distortion due to wide-angle deflection of the beams, as aforesaid, is most advantageously achieved, particularly without imparting undesirable aberrations or astigmatism to the beams as a result of the focusing thereof, when the dimensional relationships of the electrode portions $G_{4a}$ and $G_{4b}$ correspond to the inequalities indicated at (1), (2) and (3) above. In this connection, it has been found that if the length $l$ of each tubular electrode portion $G_{4a}$ or $G_{4b}$ is equal to or greater than 0.46 $D_1$, the focusing effect is reduced and, therefore, an undesirably high focusing voltage is required to achieve the desired focusing of beams $B_r, B_g$ and $B_b$ at screen 3. On the other hand, if the length $l$ is smaller than 0.3 $D_1$, the influence on the beams of the relatively narrow passage around which flanges 13 and 14 extend is undesirably accentuated and aberration appears to be increased. Further, when the dimension $D_2$ is less than 2.25 $l$ and greater than 1.75 $l$, the aberration imparted to the beams by reason of the dividing of electrode $G_4$ into the two portions $G_{4a}$ and $G_{4b}$ is minimized, that is, the aberration due to focusing of the beams is equivalent to that realized with the main focusing lens $L_M$ of FIG. 2 in which the lens electrode $G_4$ is a one-piece structure. On the other hand, if $D_2$ is greater than 2.25 $l$ or less than 1.75 $l$, spherical aberration as a result of dividing electrode $G_4$ into two portions $G_{4a}$ and $G_{4b}$ becomes undesirably great. Finally, it has been determined that, if the axial dimension $h$ of the arcuate flanges 13 and 14 exceeds 0.15 $D_1$, the electron focusing lens acquirees relatively great, and hence undesirable spherical aberration and astigmatism.

It will be appreciated that, in the cathode ray tube according to this invention, the electric field for correcting or compensating for the beam landing spot distortion due to beam deflection occurs within the main focusing lens, and more specifically within the electrode $G_4$ of that lens which has a relatively low potential applied thereto, so that each electron beam is influenced by such correcting electric field while traveling at a relatively low velocity. Accordingly, a high correction sensitivity is achieved, that is, a relatively small potential difference between electrode portions $G_{4a}$ and $G_{4b}$ is effective to correct a relatively large beam landing spot distortion, so that the production of the necessary varying correction voltage by circuit 17 is facilitated and beam spots of good quality, that is, uniform shape, can be readily achieved. This is to be compared with prior attempts to correct beam landing spot distortion due to beam deflection, and in which an electric or magnetic field for effecting the desired correction acts on the beam or beams at a location along the beam path where the beam electrons have a high velocity and can only be influenced by a field of relatively great intensity which requires considerable power to produce. For example, it may be noted that, in an existing arrangement for correcting beam landing spot distortion due to beam deflection by an electromagnetic means located at the outside of the tube envelope to form an electromagnetic quadrupole for influencing the electron beams, the voltage required for effecting the desired correction is, for example about 2000 V., whereas, a correcting voltage of, at most, several hundred volts is sufficient to provide the necessary correction in the cathode ray tube according to this invention.

Further, it will be seen that, in the preferred embodiment of the invention described above, and illustrated on FIG. 3, the correcting electric field for correcting or compensating for the beam landing spot distortion is produced within the main focusing lens at a location near to that at which the three beams $B_r, B_g$ and $B_b$ are made to intersect so that all three beams pass through the correcting electric field near to the axis $0-0'$. Accordingly, the correction of beam landing spot distortion due to beam deflection can be realized without imparting significant aberration to any of the beams by reason of such correction, and through the use of a relatively small varying correction voltage for reducing power consumption.

Finally, since the paths of beams $B_r, B_g$ and $B_b$ are surrounded by flanges 13 and 14 at the location where such beams are being influenced by the correcting electric field, such correcting field is shielded by flanges 13 and 14 from the disturbing effects of any external fields to ensure the desired accurate correction or compensation for beam landing spot distortions due to beam deflection.

Although an illustrative embodiment of the invention has been described in detail herein with reference to the accompanying drawings, it is to be understood that the invention is not limited to that precise embodiment, and that various changes and modifications may be effected therein by one skilled in the art without departing from the scope or spirit of the invention as defined in the appended claims.

What is claimed is:

1. In a cathode ray tube comprising a tube envelope having a phosphor screen; an electron gun in said tube envelope including beam producing means directing at least one electron beam along the axis of said tube envelope toward said screen for impingement on the latter, and main electron lens means disposed between said beam producing means and said screen for focusing each said beam at said screen, said main electron lens means having at least two tubular electrodes arranged coaxially is succession along said axis of the tube envelope for the passage of each said beam through said electrodes with a relatively low potential being applied to one of said electrodes and a relatively high potential being applied to the other of said electrodes for producing an electrical field which effects said focusing of each said beam; and deflection yoke means on said tube envelope between said main electron lens means and said screen for angularly deflecting each said beam from said axis so as to scan said screen in line-scanning and vertical directions, respectively: the improvement of said one tubular electrode which is maintained at said relatively low potential consisting of first and second axially divided tubular electrode portions having respective end plates extending across their adjacent ends, said end plates of said first and second electrode portions having first and second apertures, respectively, which are aligned with each other for the passage therethrough of each said beam during the focusing of the latter; a first pair of diametrically opposed flanges projecting from the periphery of said first aperture in the axial direction toward said second aperture; and a second pair of diametrically opposed flanges projecting from the periphery of said second aperture in the axial direction toward said first aperture and being orthogonally disposed in relation to said first pair of flanges so as to be interfitted between the latter, so that the application across said first and second electrode portions of a correction voltage which varies with the angle of deflection of each said beam from said axis is effective to provide a varying electric field for obtaining a uniform shape of the landing spot of each said beam on said screen.

2. A cathode ray tube according to claim 1; in which said main electron lens means is of the unipotential type and further includes a third tubular electrode aligned axially with said two electrodes, said relatively high potential is also applied to said third electrode, and said one electrode to which said relatively low potential is applied is axially interposed between said other end third electrodes to which said relatively high potential is applied.

3. A cathode ray tube according to claim 1; in which said screen has arrays of phosphor areas emitting different colors and which are arranged in groups, said beam producing means directs additional electron beams toward said screen from points of origin that are spaced from the point of origin of said one beam for impingement of said one beam and said additional beams on respective phosphor areas of said screen, and said electron gun further includes means converging said beams from their respective points of origin for causing said beams to intersect each other at a location substantially centered within said main electron lens means.

4. A cathode ray tube according to claim 3; in which said main electron lens means is of the unipotential type and further includes a third tubular electrode aligned axially with said two electrodes, said relatively high potential is also applied to said third electrode, said one electrode to which said relatively low potential is applied is axially interposed between said other and third electrodes to which said relatively high potential is applied, and said means converging the beams causes said location at which the beams intersect to be disposed substantially centered in said first and second apertures.

5. A cathode ray tube according to claim 4; in which said electron beams exit from said main electron lens means along divergent paths, and said electron gun further includes convergence deflecting means arranged along said divergent paths for reconverging said electron beams to impinge on respective phosphor areas of one of said groups thereof.

6. A cathode ray tube according to claim 4; in which said points of origin of said additional beams are at opposite sides of, and in a common horizontal plane with said point of origin of said one beam.

7. A cathode ray tube according to claim 4; in which each of said first and second apertures is substantially circular and said flanges are arcuate and of substantially equal angular extent.

8. A cathode ray tube according to claim 7; in which the axial length $l$ of each of said tubular electrode portions is selected to satisfy the following inequality $$0.46\ D_1 > l > 0.3\ D_1$$

in which $D_1$ is the inner diameter of each of said tubular electrode portions.

9. A cathode ray tube according to claim 7; in which the diametrical distance $D_2$ between the inner surfaces of said first pair of flanges and of said second pair of flanges is selected to satisfy the following inequality $$2.25\ l > D_2 > 1.75\ l$$

in which $l$ is the axial length of each of said tubular electrode portions.

10. A cathode ray tube according to claim 7; in which the axial distance $h$ that said flanges project from the inner surfaces of the respective end plates is selected to satisfy the following inequality $$0.15\ D_1 > h > 0$$

in which $D_1$ is the inner diameter of each of said tubular electrode portions.

11. A cathode ray tube according to claim 7; in which said tubular electrode portions are dimensioned to satisfy the following inequalities $$0.46\ D_1 > l > 0.3\ D_1$$
$$2.25\ l > D_2 > 1.75\ l$$
$$0.15\ D_1 > h > 0$$

where, $D_1$ is the inner diameter of each of said tubular electrode portions, $l$ is the axial length of each of said tubular electrode portions, $D_2$ is the diametrical distance between the inner surfaces of said first pair of flanges and of said second pair of flanges, and $h$ is the axial distance that each of said flanges projects beyond the inner surface of the respective one of said end plates.

* * * * *